United States Patent [19]
Tsuchiya et al.

[11] Patent Number: 5,517,640
[45] Date of Patent: May 14, 1996

[54] DATA RETRIEVING METHOD AND APPARATUS PROVIDING SATISFACTION OR AGREEMENT DEGREE

[75] Inventors: Masayuki Tsuchiya, Hiratsuka; Takashi Muramatsu, Yokohama; Kazuhiro Satoh, Ebina; Mitsunobu Tasaka; Hiroshi Fujise, both of Yokohama, all of Japan

[73] Assignees: Hitachi, Ltd., Tokyo; Hitachi Software Engineering Co., Ltd, Yokohama, both of Japan

[21] Appl. No.: 957,393

[22] Filed: Oct. 7, 1992

[30] Foreign Application Priority Data

Oct. 7, 1991 [JP] Japan ................ 3-258878

[51] Int. Cl.$^6$ .................................................. G06F 17/30
[52] U.S. Cl. ................ 395/600; 364/974.6; 364/DIG. 2
[58] Field of Search ................ 395/600; 364/DIG. 1, 364/DIG. 2

[56] References Cited

U.S. PATENT DOCUMENTS 4,267,568  5/1981  Dechant et al. ................ 395/600
5,297,042  3/1994  Morita ................ 364/419.19
5,303,361  4/1994  Colwell et al. ................ 395/425
5,321,833  6/1994  Chang et al. ................ 395/600

FOREIGN PATENT DOCUMENTS 2-87275  3/1990  Japan .

*Primary Examiner*—Thomas G. Black
*Assistant Examiner*—Maria N. Von Buhr
*Attorney, Agent, or Firm*—Antonelli, Terry, Stout & Kraus

[57] ABSTRACT

A data retrieving method and apparatus capable of narrowing the range of retrieved data without changing the retrieving condition equation, capable of retrieving data by designating relative conditions, and capable of providing indices for helping a user to judge the properness of retrieved results. The data retrieving apparatus includes a term defining unit for defining a fuzzy term designated by a user and related terms and assigned to an item to be retrieved, by setting a retrieving condition range for each of the terms and a distribution curve representing an optimum distribution within the retrieving condition range for each term, a satisfaction degree evaluating unit for calculating a satisfaction degree of the retrieved data by using a function allocated to the distribution curve, and a condition analyzing unit for transforming the fuzzy term into numerical values to obtain a value-based retrieving condition equation.

12 Claims, 15 Drawing Sheets

FIG. 4

ITEM NAME : COMMODITY UNIT PRICE    WEIGHT( )

| TERM | RANGE | DISTRIBUTION CURVE | THREE-POINT VALUES | |
|---|---|---|---|---|
| HIGH | 100 ~ 80 % | No.5 | MAXIMUM | 408 |
| | | | CENTER | 409 |
| | | | MINIMUM | 410 |
| LESS HIGH | 85 ~ 60 % | No.4 | MAXIMUM | |
| | | | CENTER | |
| | | | MINIMUM | |
| | --- | | | |
| LOW | 19 ~ 0 % | No.1 | MAXIMUM | |
| | | | CENTER | |
| | | | MINIMUM | |

FIG. 7

TERM INFORMATION TABLE — 701

| ITEM NAME | THREE-POINT VALUES | | | WEIGHT | SECOND TABLE NAME |
|---|---|---|---|---|---|
| | MAXIMUM | CENTER | MINIMUM | | |
| COMMODITY UNIT PRICE | | | | 1.2 | TABL 2 |
| COMMODITY WEIGHT | | | | 0.8 | TABL 3 |

702, 703, 704, 705

TABL 2 — 706

| TERM | RANGE | DISTRIBUTION CURVE NO |
|---|---|---|
| HIGH | 100 ~ 80 | 5 |
| LESS HIGH | 85 ~ 60 | 4 |
| MEDIUM | 70 ~ 45 | 3 |
| LESS LOW | 50 ~ 30 | 2 |
| LOW | 40 ~ 0 | 1 |

707, 708, 709

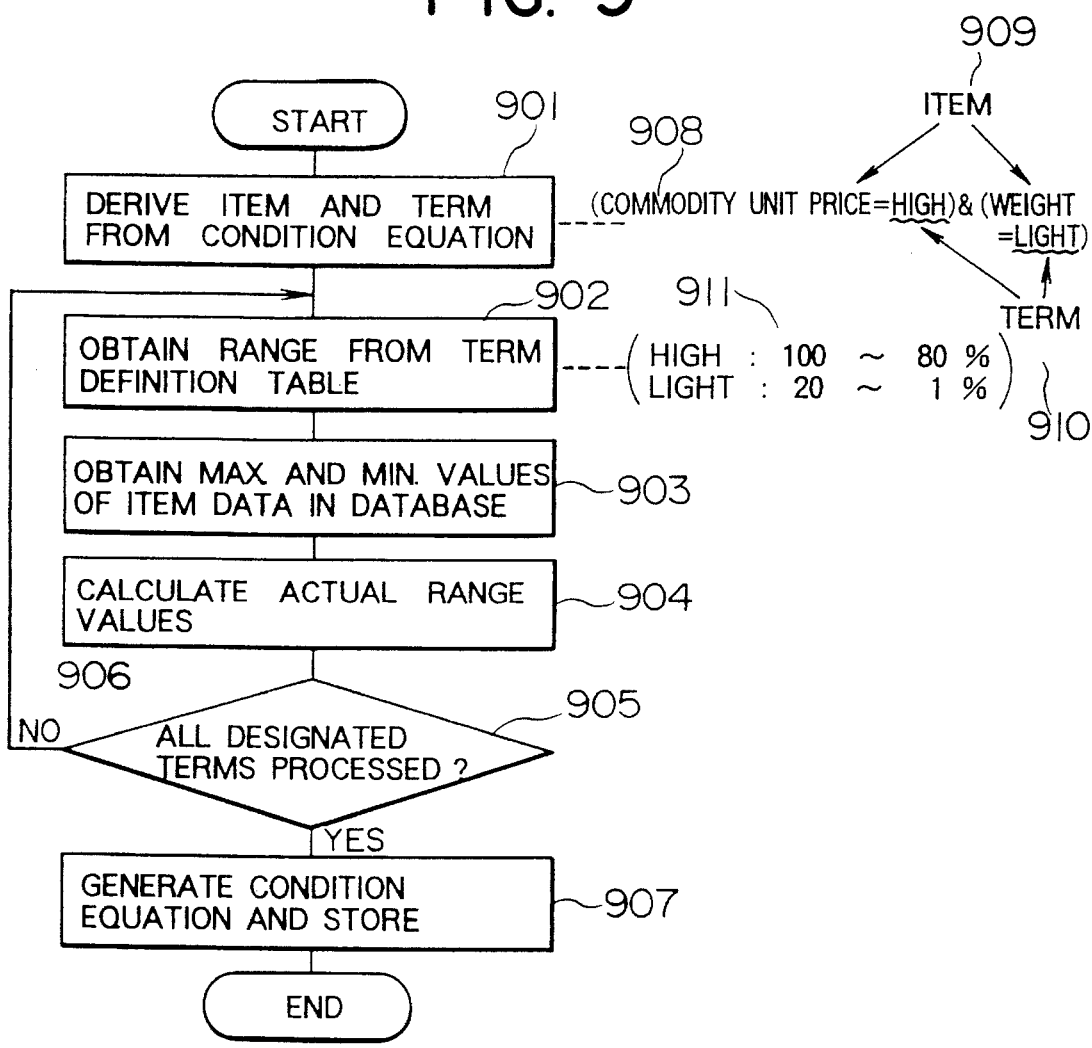

FIG. 13
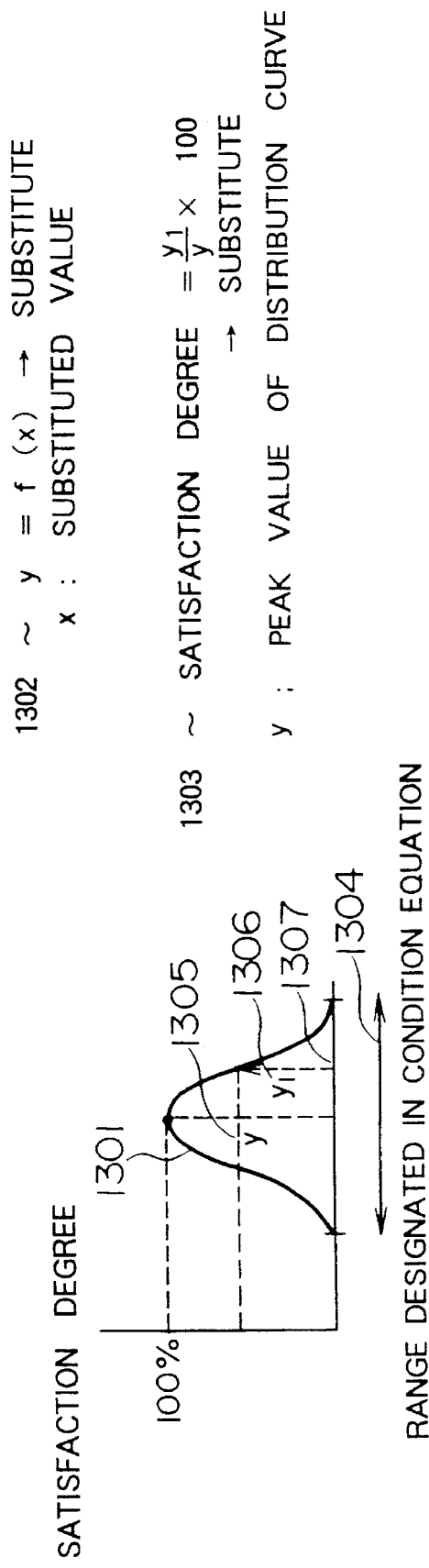
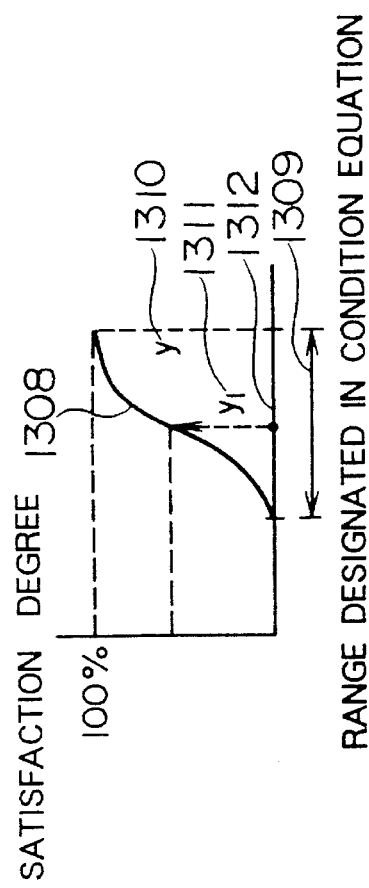
$1302 \sim y = f(x) \rightarrow$ SUBSTITUTE
$x$ : SUBSTITUTED VALUE
$1303 \sim$ SATISFACTION DEGREE $= \frac{y_1}{y} \times 100$
$\rightarrow$ SUBSTITUTE
$y$ : PEAK VALUE OF DISTRIBUTION CURVE

FIG. 14

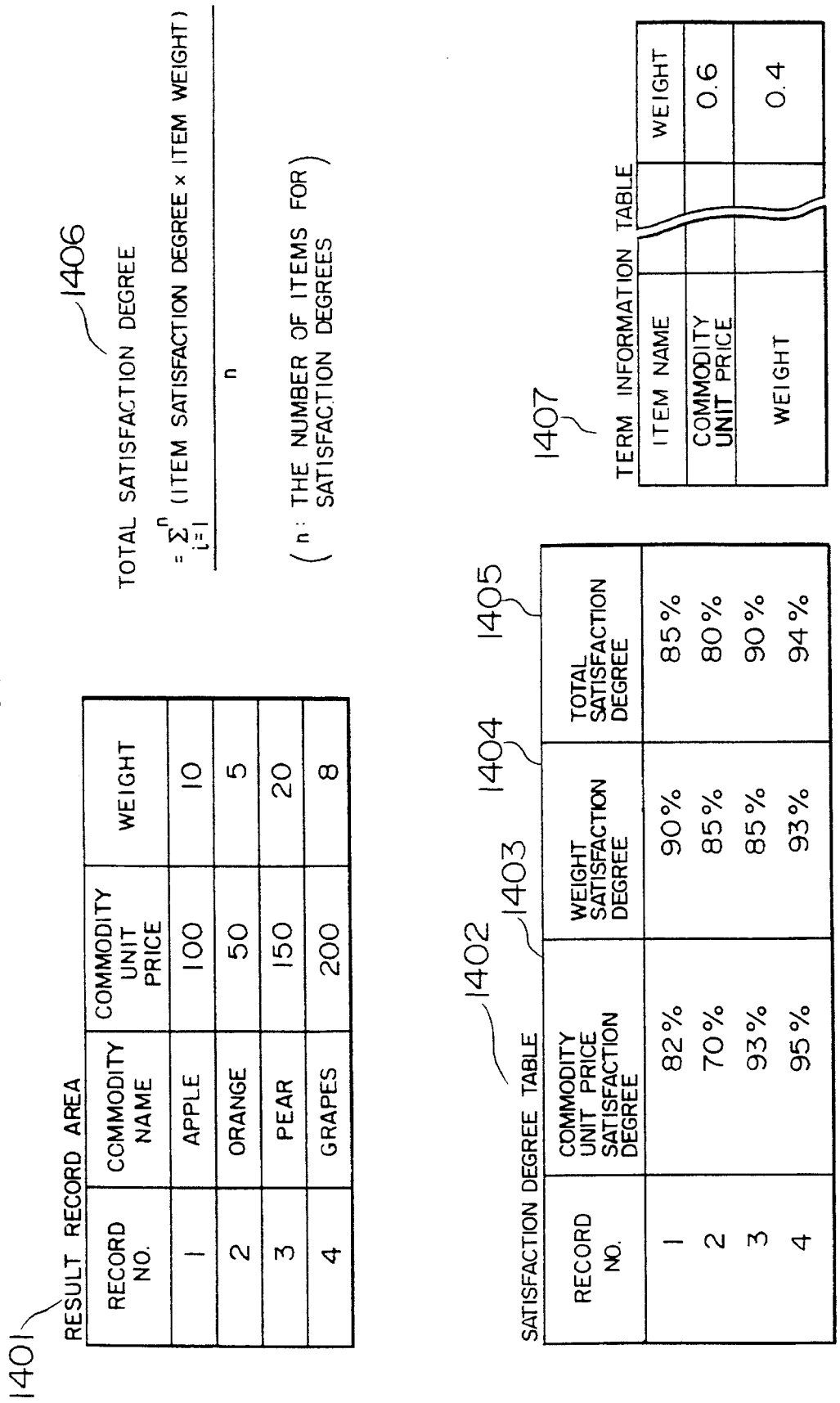

RESULT RECORD AREA 1401

| RECORD NO. | COMMODITY NAME | COMMODITY UNIT PRICE | WEIGHT |
|---|---|---|---|
| 1 | APPLE | 100 | 10 |
| 2 | ORANGE | 50 | 5 |
| 3 | PEAR | 150 | 20 |
| 4 | GRAPES | 200 | 8 |

TOTAL SATISFACTION DEGREE 1406

$$= \frac{\sum_{i=1}^{n}(\text{ITEM SATISFACTION DEGREE} \times \text{ITEM WEIGHT})}{n}$$

(n: THE NUMBER OF ITEMS FOR SATISFACTION DEGREES)

SATISFACTION DEGREE TABLE

| RECORD NO. | COMMODITY UNIT PRICE SATISFACTION DEGREE 1402 | WEIGHT SATISFACTION DEGREE 1403 | TOTAL SATISFACTION DEGREE 1404 1405 |
|---|---|---|---|
| 1 | 82% | 90% | 85% |
| 2 | 70% | 85% | 80% |
| 3 | 93% | 85% | 90% |
| 4 | 95% | 93% | 94% |

TERM INFORMATION TABLE 1407

| ITEM NAME | WEIGHT |
|---|---|
| COMMODITY UNIT PRICE | 0.6 |
| WEIGHT | 0.4 |

DATA RETRIEVING METHOD AND APPARATUS PROVIDING SATISFACTION OR AGREEMENT DEGREE

BACKGROUND OF THE INVENTION

1. Field of the Invention

The present invention relates to a data retrieving technique, and more particularly to a data retrieving method and apparatus for retrieving data and narrowing the range of retrieved data, while referring to a displayed agreement or satisfaction degree relative to a given retrieving condition.

2. Description of the Related Art

In a conventional data retrieving process, numerical values of an item to be retrieved are designated as retrieving conditions. For example, consider a database file storing data of at least prices and weights. In retrieving high prices and light weights from such a database file, a retrieving condition equation "Price>100 & Weight≧50" for example is used for the data retrieval. In this case, retrieved data falls within the price range higher than "100" and within the weight range equal to or smaller than "50". If the range of retrieved data is to be further narrowed, a new retrieving condition equation is used which is assigned different values determined with reference to the first data retrieval results. If more desired data is to be selected from the retrieved data, a synthetic decision for such selection has been prepossessed by the user.

The publication of JP-A-2-87275 describes that a retrieving condition equation having a question inclusive of fuzzy values is transformed into a new retrieving condition equation assigned the same attributes as those stored in an index unit. A list of the attributes are displayed on a display screen, allowing a user to designate the retrieving conditions by using attribute terms.

With the above-described conventional technique, if a user cannot determine easily the numerical values to be assigned to the retrieving condition equation, the user determines from the sixth sense the range of data to be retrieved. The process of narrowing the range of retrieved data, including a step of checking the retrieved results, a step of changing the retrieving condition equation, and a step of retrieving data again, has been repeated heretofore in many cases. Data retrieval through designation of rough or fuzzy retrieving conditions was impossible.

In determining the properness of retrieved results, only a user's sixth sense has been relied upon. It is therefore difficult to again perform the data retrieval by changing the retrieving condition equation, and to make an objective judgment. Furthermore, there is no practical means for synthetically evaluating retrieved results or weight-added retrieved results, so that determining the range of data to be retrieved has been relied upon the sixth sense or intuition.

SUMMARY OF THE INVENTION

It is an object of the present invention to provide a data retrieving method and apparatus capable of narrowing the range of retrieved data without changing the retrieving condition equation, capable of retrieving data by designating relative conditions, and capable of providing indices for helping a user judge the properness of retrieved results.

According to an aspect of the present invention achieving the above object, first designated are a term, a range for the term, and a function used for calculating an agreement degree or satisfaction degree of retrieved data. In the data retrieving operation, the actual retrieving range is determined from the term to be retrieved and included in an input retrieving condition equation, the maximum and minimum values of item data stored in a database file, and the designated range for the term. The satisfaction degree is calculated by substituting the retrieved item data value into the function, and displayed on a display screen together with the retrieved data. If a plurality of items to be retrieved are included in the retrieving condition equation, a total satisfaction factor for the plurality of items is calculated by adding a weight to each term. A list of the number of retrieved data for each satisfaction degree is displayed so as to allow a user to designate one of the satisfaction degrees for the display of the corresponding retrieved data. The retrieved data is used to further repeat the data retrieving.

With the data retrieving method and apparatus arranged in the above-described manner, the actual retrieving condition values can be determined from the maximum and minimum values of each item to be retrieved from a data set in a database file, and from the calculated range values assigned to each term. Therefore, it is possible to designate a retrieving condition equation not by numerical values but by terms.

A function of calculating a satisfaction degree is provided for each term, so that a satisfaction degree for each retrieved data and the number of retrieved data for each satisfaction degree can be calculated by using the retrieved result data.

Furthermore, retrieved data can be derived by designating a satisfaction degree, and the same retrieving condition equation can be repetitively used for the derived data.

Still further, a total satisfaction degree calculated from a plurality of satisfaction degrees is displayed, allowing a synthetic evaluation of retrieved data whether the data satisfies the retrieving condition equation.

BRIEF DESCRIPTION OF THE DRAWINGS

FIG. 4 shows the format of a term definition displayed on a display screen.

FIG. 7 shows an example of a term information table.

FIG. 9 is a flow chart showing a method of generating a retrieving condition equation.

FIG. 10 is a diagram showing a commodity file and an equation for calculating the actual values of a range.

FIG. 13 illustrates a method of calculating an satisfaction degree.

FIG. 14 illustrates a method of calculating a total agreement degree.

DETAILED DESCRIPTION OF THE PREFERRED EMBODIMENTS

An embodiment of the present invention will be described with reference to the accompanying drawings.

Figure 1:
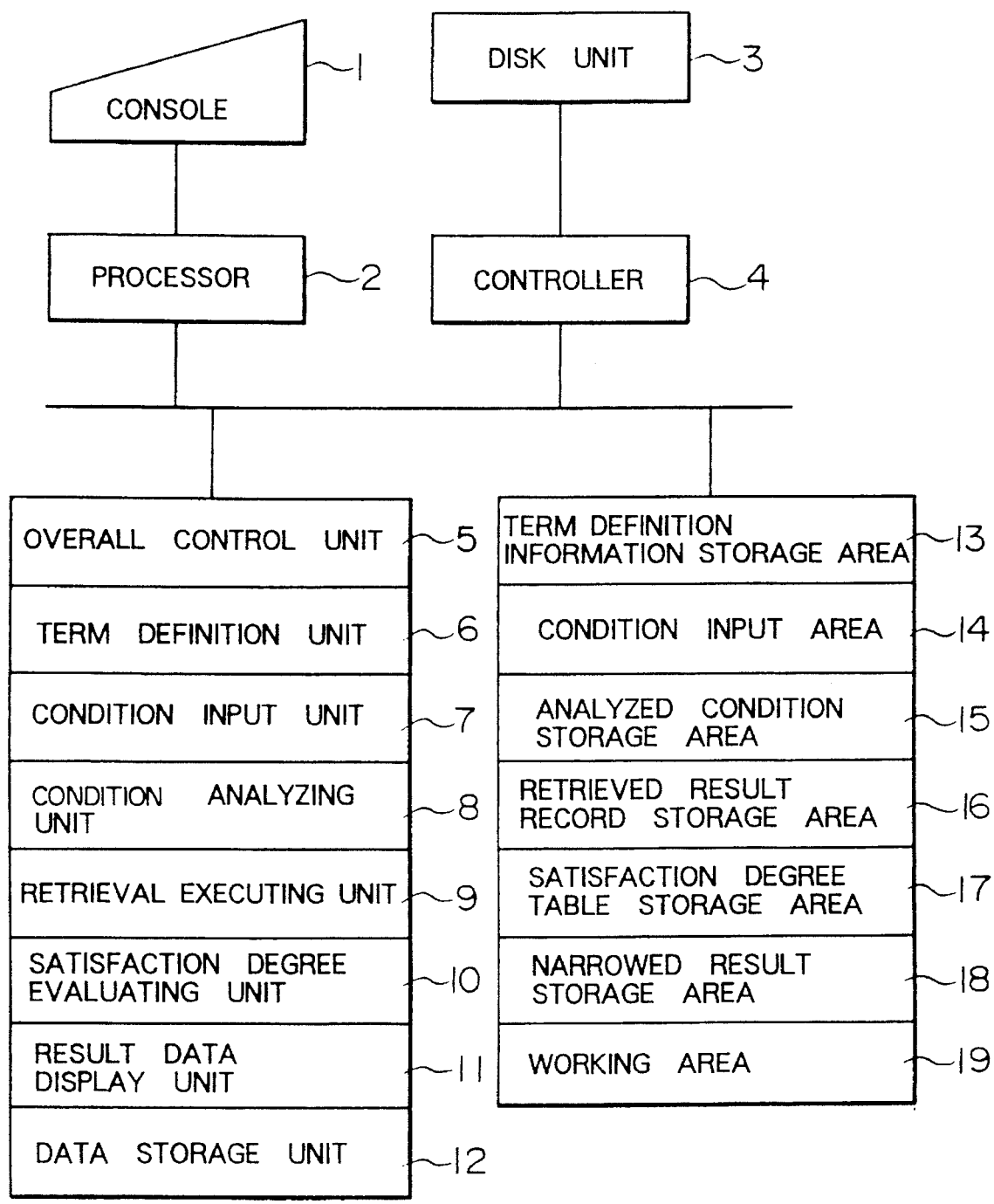
FIG. 1 is a schematic diagram showing the outline of a data retrieving apparatus according to an embodiment of the present invention.

FIG. 1 shows the overall structure of a data retrieving apparatus according to an embodiment of the present invention. The data retrieving apparatus includes a console unit 1, a processor 2, a disk unit 3 for storing files and processed information, a controller 4, various execution program units 5 to 12, and various information storage areas 13 to 19. With the help of the processor 2, a term definition unit 6 processes the definition of a term entered from the console unit 1 under the control of the main control unit 5, and stores the term definition in a term definition storage area 13.

Thereafter, retrieving conditions entered from the console unit 1 are stored in a condition input area 14 under the control of a condition input unit 7. In accordance with the term definition information stored in the term definition storage area 13, a condition analyzing unit 8 analyzes the conditions stored in the condition input area 14 to generate a value-based retrieving condition equation. By using this generated equation, a retrieval executing unit 9 performs the data retrieval of data stored in a database file. The retrieved result data is stored in a retrieved result record storage area 16.

Next, in accordance with the data stored in the retrieved result record storage area 16, a satisfaction degree evaluating unit 10 calculates a satisfaction degree at a working area 19 by using the data stored in the term definition information storage area 13, and stores it in a satisfaction degree table storage area 17. A retrieved result data displaying unit 11 displays the calculated results on a display screen. A user may perform the data retrieval again to narrow the range of retrieved data, if necessary. A data storage unit 12 stores the retrieved data of a narrowed range in a retrieved and narrowed result storage area 18.

Figure 2:
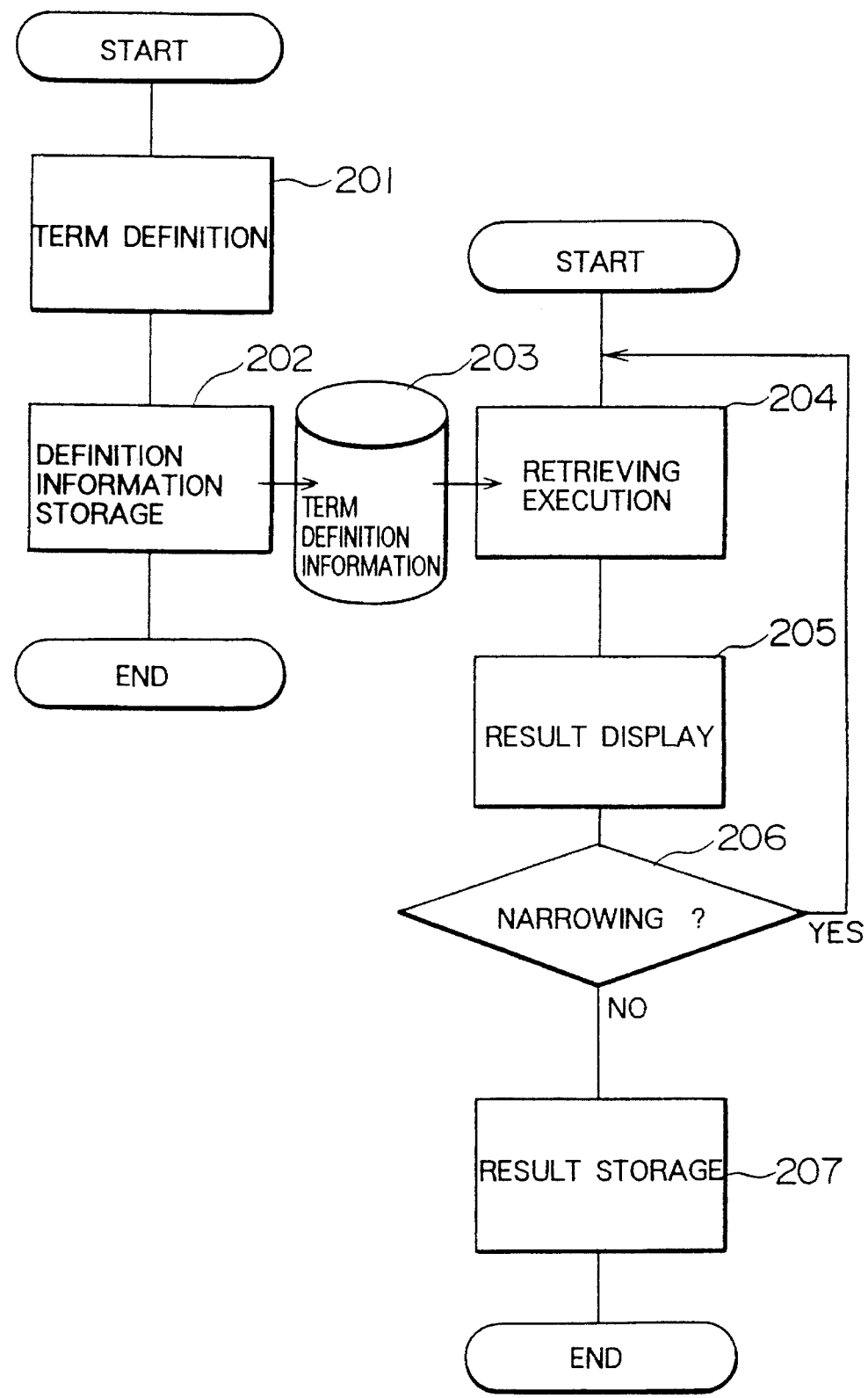
FIG. 2 is a flow chart showing the overall operation by a data retrieving method according to an embodiment of the present invention.

FIG. 2 is a flow chart showing the outline of the operation of the data retrieval according to the embodiment. The whole procedure is divided into a preliminary process and a data retrieving process. Steps 201 and 202 show the preliminary process.

At step 201, ranges, distribution curves (membership functions), and weights of each term of an item to be retrieved are defined or designated. These retrieving parameters will be detailed later. At step 202 the defined information is stored in a term definition information file 203.

Steps 204 to 207 show the data retrieving process. At step 204, a retrieving condition equation entered by a user is received and analyzed by using the term definition information stored in the term definition information file 203, to thereafter start the data retrieval. At step 205 the retrieved results and satisfaction degrees are displayed. At step 206 it is checked if the desired results were obtained. If obtained, the retrieved results are stored at step 207.

Figure 3:
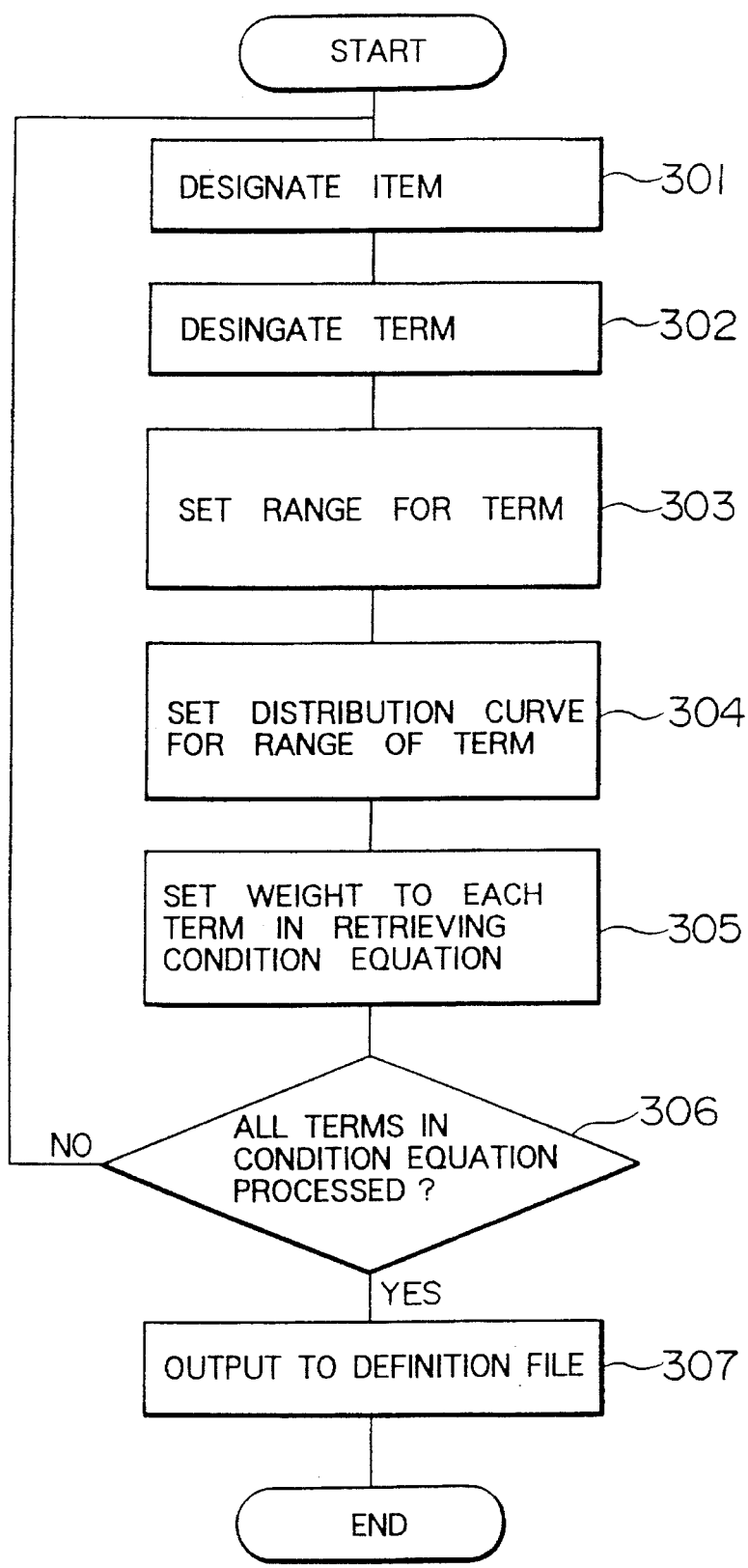
FIG. 3 is a detailed flow chart showing the process of designating the term definition explained in FIG. 2.

FIG. 3 shows the details of the steps 201 and 202 shown in FIG. 2. The preliminary process will be further detailed with reference to the flow chart shown in FIG. 3 and a format shown in FIG. 4.

At step 301, an item name 402 to be used in a retrieving condition equation is designated.

At step 302, terms for the designated item of an object to be retrieved by the retrieving condition equation are designated. At step 303 a range for each of the designated terms is designated. In this embodiment, the ranges 405 or three-point values 407 are designated. The "range" 405 is designated by percentages, and it indicates that the value of the designated item 402 should fall within the range from A% to B% of values of all data stored in a database. The "three-point values" are the maximum, center, and minimum values x of a distribution curve $y=f(x)$, this value x is not represented by a percentage but by a real value.

At step 304, a distribution curve for each term is selected. At step 305, a weight of each term is set. The weight is a coefficient representing to what extent each term included in a retrieving condition equation is emphasized. For example, if a retrieving condition equation of (Commodity Unit Price=High) & (Weight=Light) is given and the item "Commodity Unit Price" is to be more emphasized than the item "Weight", then the weight of the commodity unit price item is set to 1.2 and that of the weight item is set to 0.8 so as to reflect a user's transcendental recognition and intent. If both the retrieving items are to be processed equally, obviously the same weight 1.0 is set.

At step 306 it is checked whether all items to be used by a retrieving condition equation have been designated. If designated, the designated retrieving parameters are outputted to the term definition information file step 307.

Referring to FIG. 4 showing a term definition format 401, the designated item is set at 402. The weight designated at step 305 is set at 403. The designated terms are set at a term column 404. The range for each designated term is set at a range column 405. The type of each designated distribution curve is set at a curve column 406. Not the range but real condition values, if already known, of a retrieving condition equation are set at a three-point value column 407. In this case, the range for a term is designated by three maximum, center (middle), and minimum point values 408–410, respectively. A user can designate the range either by percentages or three-point values.

Figure 5:
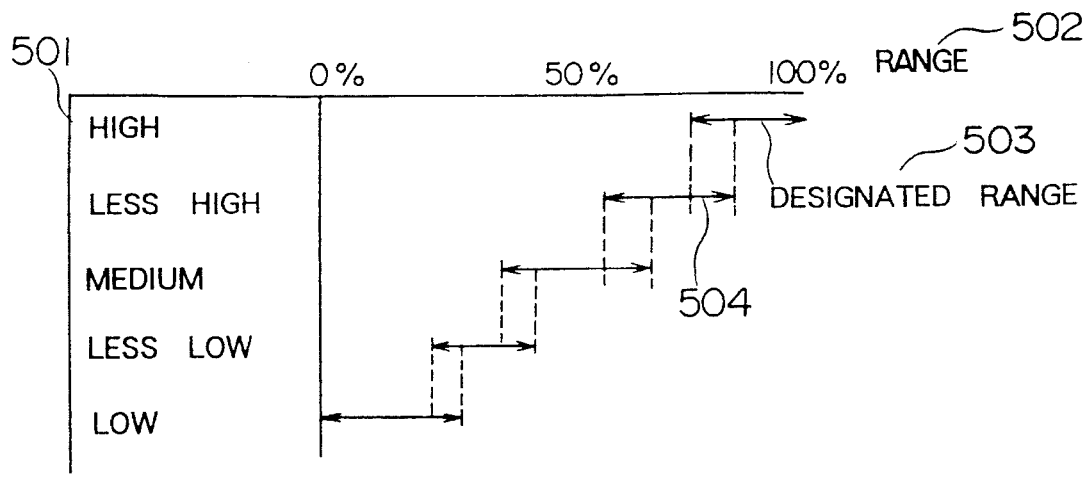
FIG. 5 is a diagram showing how the range for each term is designated.

FIG. 5 shows an example of designated terms and ranges. The terms indicated at 501 are those designated at steps 301 to 307. Each term is assigned a range such as that indicated at 503 within the total range from 0 to 100% indicated at 502. Ranges assigned to terms may be overlapped as indicated at 504. The range is independently assigned to each term, allowing overlapped ranges. Terms indicated at 501 can be designated by a user as desired.

Figure 6:
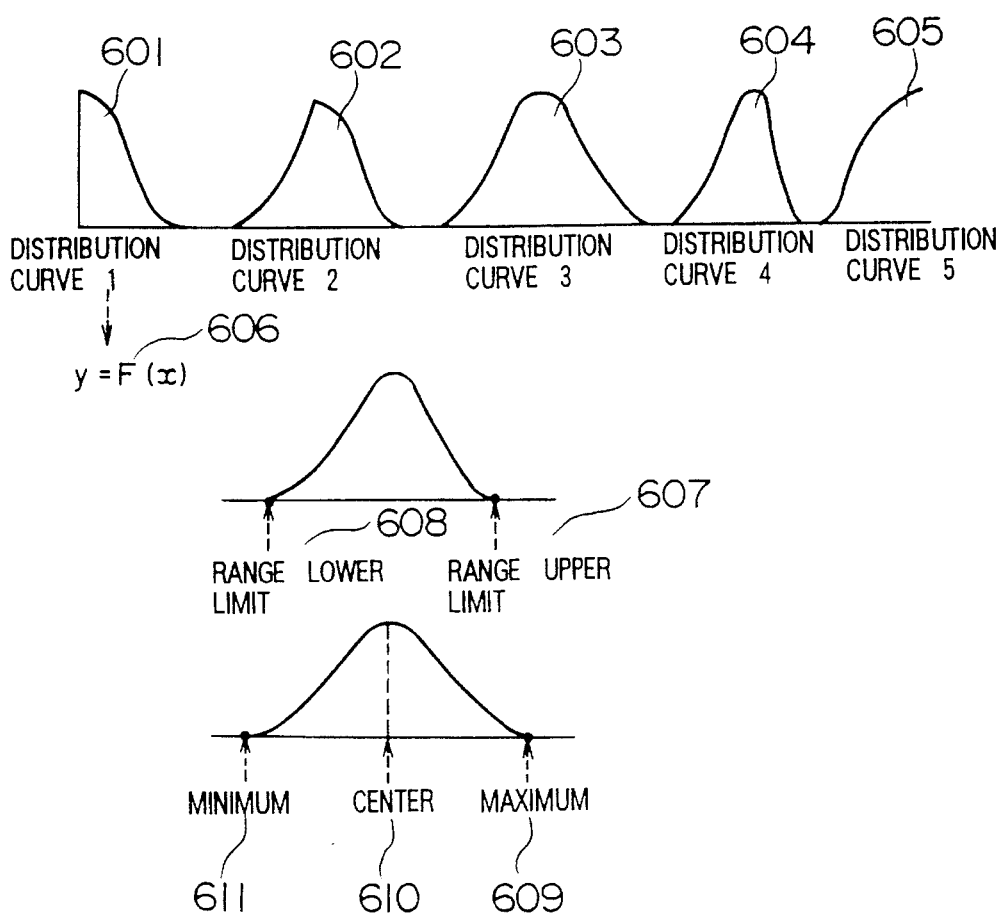
FIG. 6 shows a distribution curve or membership function of a fuzzy set for each term.

FIG. 6 shows examples of distribution curves to be designated for each term at step 304. Each distribution curve is determined based upon a user's transcendental recognition, and substantially corresponds to a membership function for a fuzzy set. A desired distribution curve whose waveform satisfies the distribution of item values is selected from the curves 601 to 605 prepared beforehand. It is to be noted that the waveform of each distribution curve can be modified sophisticatedly in accordance with a user's expert knowledge and know-how. Each curve is defined by a function shown at 606. A satisfaction degree is obtained by entering retrieving parameters in the corresponding function of each distribution curve. The "satisfaction degree" represents a degree of user satisfaction relative to the retrieved results.

For a distribution curve, upper and lower range limits 607 and 608 are designated by percentages. In designating a range from 50 to 40% for the distribution curve 3, 50% corresponds to the upper limit 607 and 40% corresponds to the lower limit 608. Alternatively, for a distribution curve, three-point values 609 to 611 are designated which correspond to the maximum, center, and minimum point values. The wave-shape of the distribution curve varies depending upon these point values.

FIG. 7 shows a term information table 701 for storing the information designated at steps 301 to 307.

The term information table 701 includes a first term information table for all items and a second term information table 706 for each item. Table 701 includes an item name 702, three point values 703, a weight value 704 and a second table name 705. The second term information table 706 stores information of terms 707, ranges 708, and distribution curves 709. The table information is stored as the term definition information in the file 203.

Figure 8:
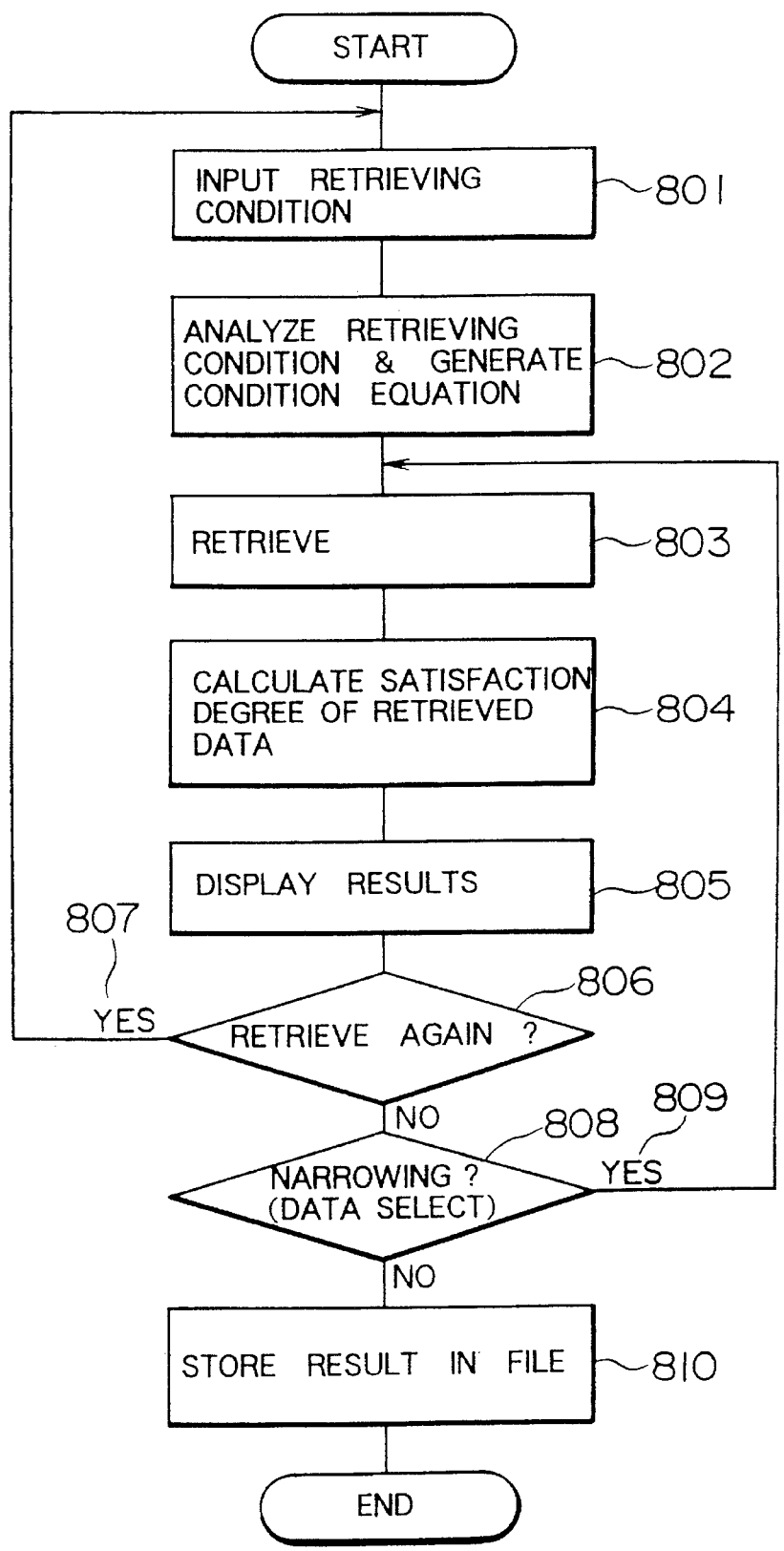
FIG. 8 is a flow chart showing the data retrieving process shown in FIG. 2.

FIG. 8 is a flow chart showing the data retrieving process. At step 801 a retrieving condition equation is entered from the console unit 1. This retrieving condition equation has terms whose values are to be retrieved. At step 802 the inputted retrieving condition equation is analyzed to generate another retrieving condition equation with the terms being defined by numerical retrieving parameter values. At step 803 the analyzed value-based retrieving condition equation is used to retrieve data from the database file. At step 804 the satisfaction degree of each retrieved data for each item whose retrieval conditions has been designated by the retrieving parameter values of the term, is calculated by using the corresponding distribution curve stored in the term information table 701. In this case, the satisfaction degree for each item as well as the total satisfaction degree can be calculated. The results are displayed on the display screen in the order starting from the largest total satisfaction degree (at step 850). The number of retrieved data for each satisfaction degree is also displayed. If a user instructs to further perform the data retrieval (in case 807), the steps 801 to 806 are repeated. If the range of the retrieved data is to be further narrowed (in case 809), the steps 803 to 808 are repeated. If neither executing the data retrieval again nor narrowing the retrieval range is necessary, the retrieved results are stored in a file at step 810.

FIG. 9 shows the details of a process of analyzing a retrieving condition equation.

First, at step 901 the items and terms are derived out of the retrieving condition equation designated by a user. In an illustrative retrieving condition equation indicated at 908, the items are indicated at 909, and the terms are indicated at 910. At step 902 the ranges by percentages or three-point values are obtained from the term information table 701. An example of ranges obtained from the table 701 are indicated at 911. After selecting either the percentages or three-point values, at step 903 the maximum and minimum values of each derived item are obtained from the database file. At step 904 the actual values of the range are calculated by using the maximum and minimum item values and the designated range values. At step 905 it is checked whether all terms derived from the retrieving condition equation have been processed. If not processed in case 906 the steps 902 to 905 are repeated. At step 907 the generated retrieving condition equation is stored in a memory at a particular storage area or in a file.

FIG. 10 is a diagram showing the process of obtaining the maximum and minimum item values from a commodity file 1001 and calculating the actual values of a range.

The actual values of a range are calculated by an equation indicated at 1004 from the maximum and minimum values stored in the commodity unit price item column 1002 and weight item column 1003.

Figure 11:
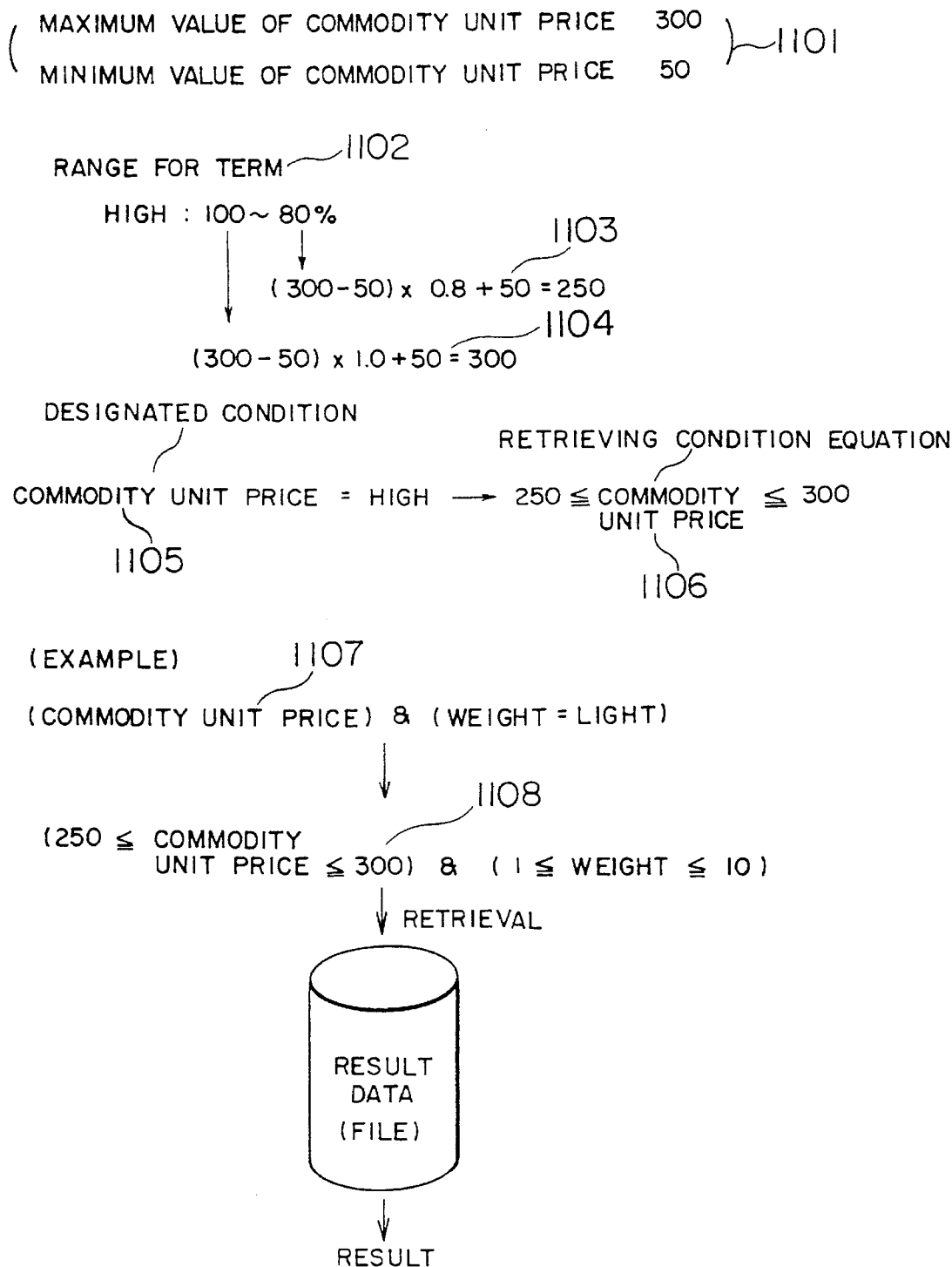
FIG. 11 illustrates an example of generating a retrieving condition equation.

FIG. 11 illustrates a process of calculating the actual values of a range, by using the data shown in FIG. 10.

The maximum and minimum values of the commodity unit price are shown indicated at 1101 in FIG. 11. If the range 1102 for the term is from 100% to 80%, the equations for calculating the actual values of the range are as indicated at 1103 and 1104. As a result, for the designated retrieving condition 1105 of "Commodity Unit Price=High", a value-based retrieving condition equation 1106 is generated. In this manner, obtained for a designated retrieving condition equation 1107 of "Commodity Unit Price=High" & "Weight=Light"" for example, are the actual commodity unit price retrieving range from minimum "250" to maximum "300" calculated by the equations 1103 and 1104, and the actual weight retrieving range from minimum "1" to maximum "10" calculated in the same manner from the data in the file shown in FIG. 10. In the above manner, the retrieving range of the designated term is changed to actual numerical values to obtain a value-based retrieving condition equation as indicated at 1108. The data retrieval is performed using this equation.

Figure 12:
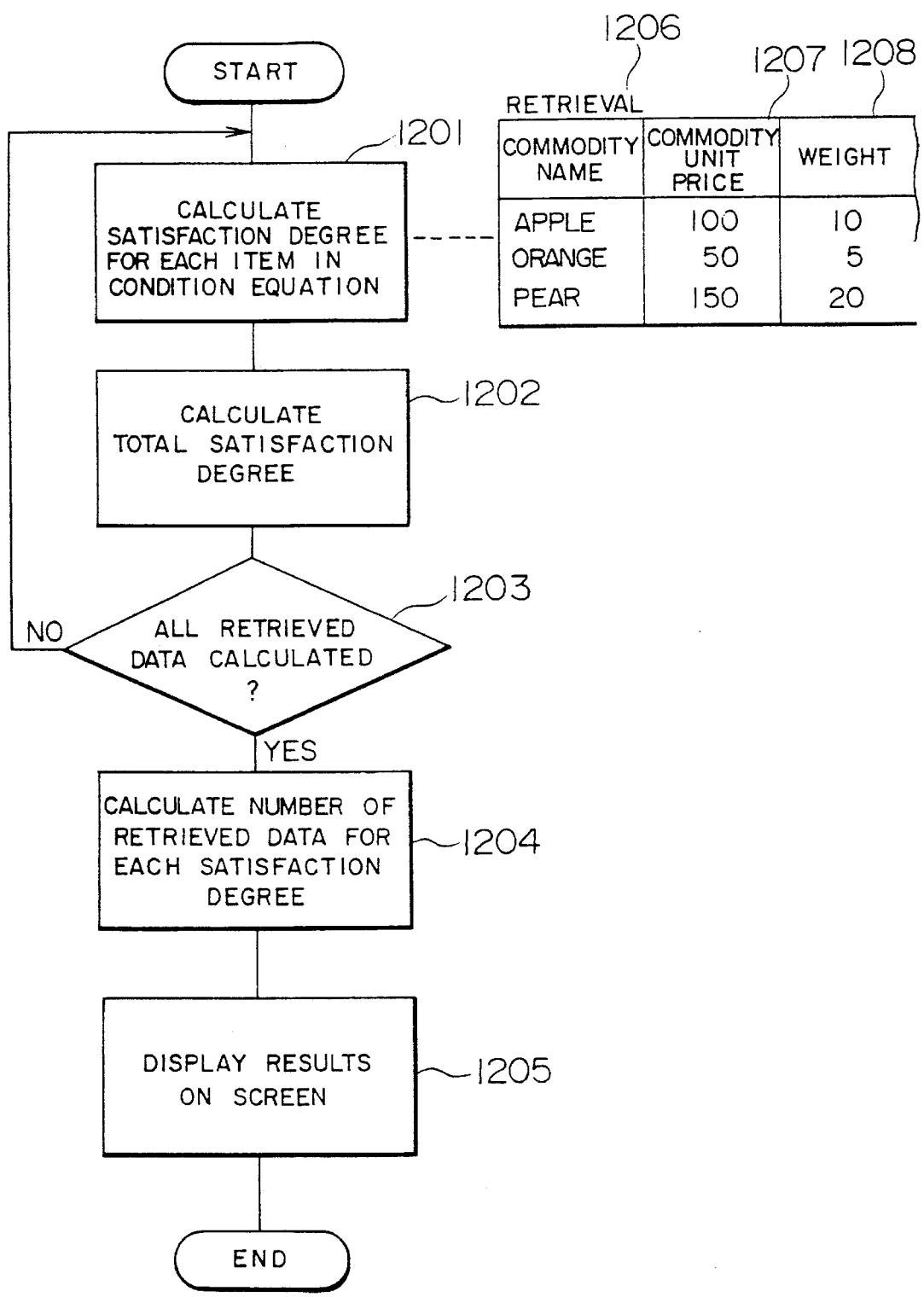
FIG. 12 is a flow chart showing a process of calculating satisfaction degrees from retrieved result data.

FIG. 12 is a flow chart showing the process of calculating a satisfaction degree and other data after the data retrieval.

At step 1201 the satisfaction degree of the retrieved result data for each item included in the retrieving condition equation is calculated by using the distribution curve stored in the term information table 701. For example, of retrieved result data records 1206, the satisfaction degrees of all commodity records each including a commodity unit price 1207 and weight 1208 are calculated. Calculated are the satisfaction degree for each term of each record and a total satisfaction degree for all items of each record (at step 1205), the latter being calculated by using weights assigned to items and stored in the term information table. At step 1203 it is checked whether the satisfaction degree and total satisfaction degree for each term and for all items of each record have been obtained. At step 1204 the number of retrieved data for each total satisfaction degree is obtained. These results are displayed as the retrieved results on the display screen (at step 1205).

FIG. 13 is a diagram explaining a method of obtaining a satisfaction degree. Consider a distribution curve indicated at 1301. The retrieved item value is substituted into an equation 1302 for this distribution curve, to obtain a result value y. First, the maximum value y indicated at 1305 of this distribution curve is obtained by substituting into the equation 1302 a condition value x corresponding to the peak value of the curve. Assuming that the retrieving range is as indicated at 1304, the maximum value y 1305 of this distribution curve corresponding to a satisfaction degree 100% is obtained at the center value of the range. The retrieved result data value 1307 is substituted into the equation 1302 to obtain a value y1 1306. In this case, the satisfaction degree is calculated by an equation (y1/y) * 100% indicated at 1303. For the case of a distribution curve 1308, at the value y 1310 of this curve corresponding to the maximum value of the designated retrieving range 1309, a satisfaction degree 100% is obtained. Using a value y1 1311 for each retrieved result data value y1 1312, the satisfaction value can be calculated from the equation (y1/y) * 100%.

FIG. 14 is a diagram explaining a method of calculating a total satisfaction degree. A satisfaction degree for each item 1403, 1404 shown in a satisfaction degree table 1402 is calculated from the equation 1303 by using the retrieved data values 1401. A total satisfaction degree is calculated as an average of all products (each item satisfaction degree * each item weight). Each item weight for each record is obtained from a term information table 1407 same as the table 701 shown in FIG. 7. An equation for calculating a total satisfaction degree is indicated at 1406. The obtained total satisfaction degree for each record is stored in a satisfaction degree table 1402 at the total satisfaction degree column 1405.

Figure 15:
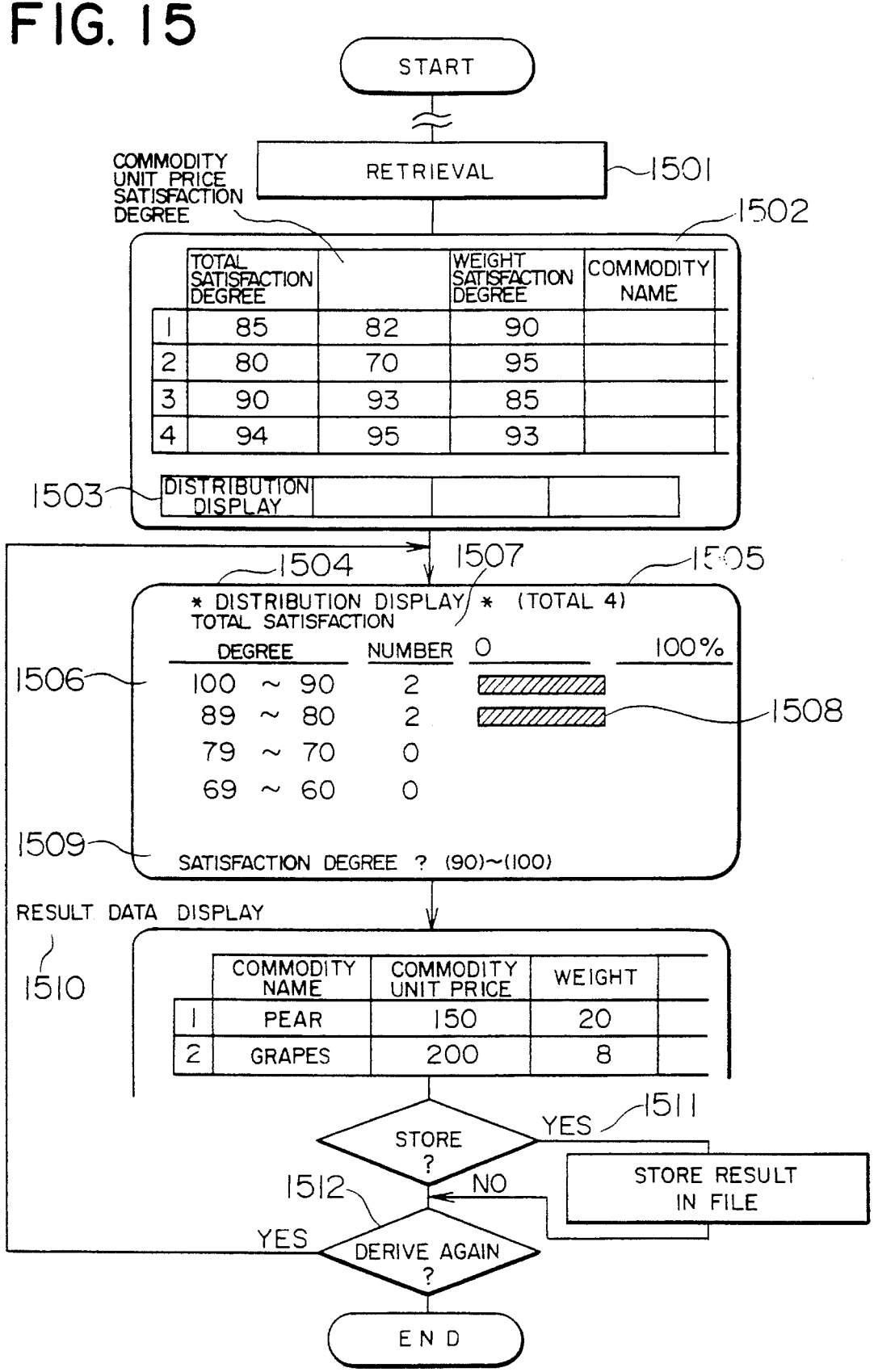
FIG. 15 shows how the retrieved data and calculated satisfaction degrees are displayed on a display screen.

FIG. 15 shows a flow of displaying the contents of the satisfaction degree table on the display screen.

After completion of the data retrieval and satisfaction degree calculation at step 1501, the satisfaction degrees for each record are displayed on the display screen as indicated at 1502. When a distribution is requested to be displayed following a guidance indicated at 1503, displayed on the display screen are the number of retrieved data within each total satisfaction degree range and a bar graph indicating a percentage of the number of retrieved data relative to the number of all retrieved data, as indicated at 1504 (at 1505). A user can derive retrieved data as desired while viewing the display screen. In deriving the desired retrieved data, its satisfaction degree range is entered at the area 1509 on the display screen so that the desired retrieved data is displayed as indicated at 1510. If the derived and displayed data is to be stored in a file and memory, a store key (not shown) is activated at 1511.

If the total satisfaction degree for retrieved data to be derived is to be changed, a re-derive key (not shown) is activated at step 1512. It is possible to narrow the range of retrieved and derived data by using the same retrieving condition and by performing the data retrieval again.

Figure 16:
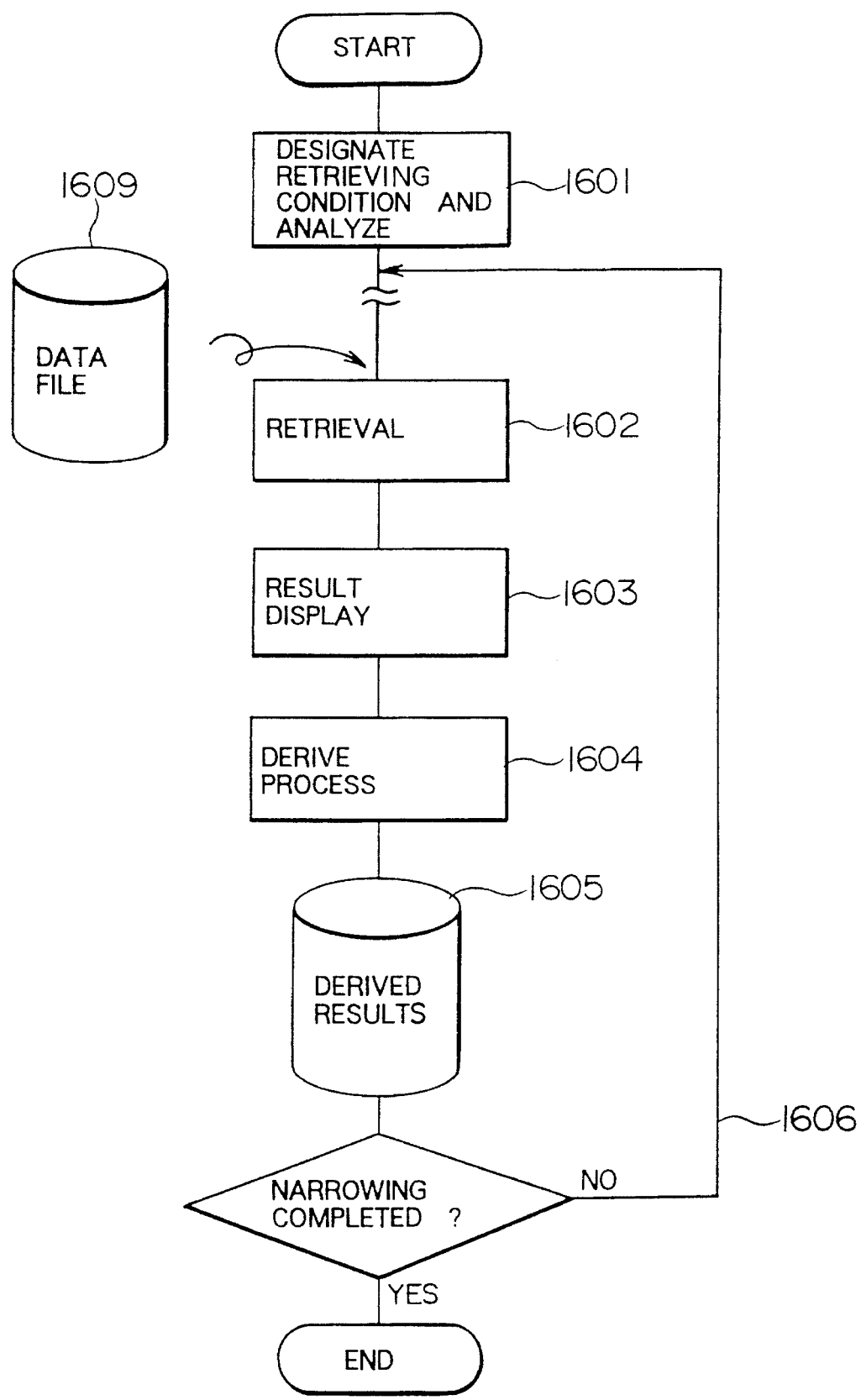
FIG. 16 is a flow chart showing the process of narrowing the range of retrieved and derived data.

The flow of narrowing the data retrieval range (condition) will be described with reference to the flow chart shown in FIG. 16.

First, at step 1601 a data retrieving condition equation is designated and analyzed. This data retrieving condition equation is transformed into a value-based retrieving condition equation. By using this equation, at step 1602 the data is retrieved from the database file 1609. At step 1603, the retrieved data value and satisfaction degrees are displayed on the display screen. At step 1604 the retrieved record data within a desired total satisfaction degree range is derived, and stored in a file 1605. It is possible to narrow the range of retrieved and derived data by using the same retrieving condition used at step 1601 or further specifying the retrieving condition and by performing the data retrieval again. This operation is repeated to narrow the range of retrieved and derived data (at 1606).

Figure 17:
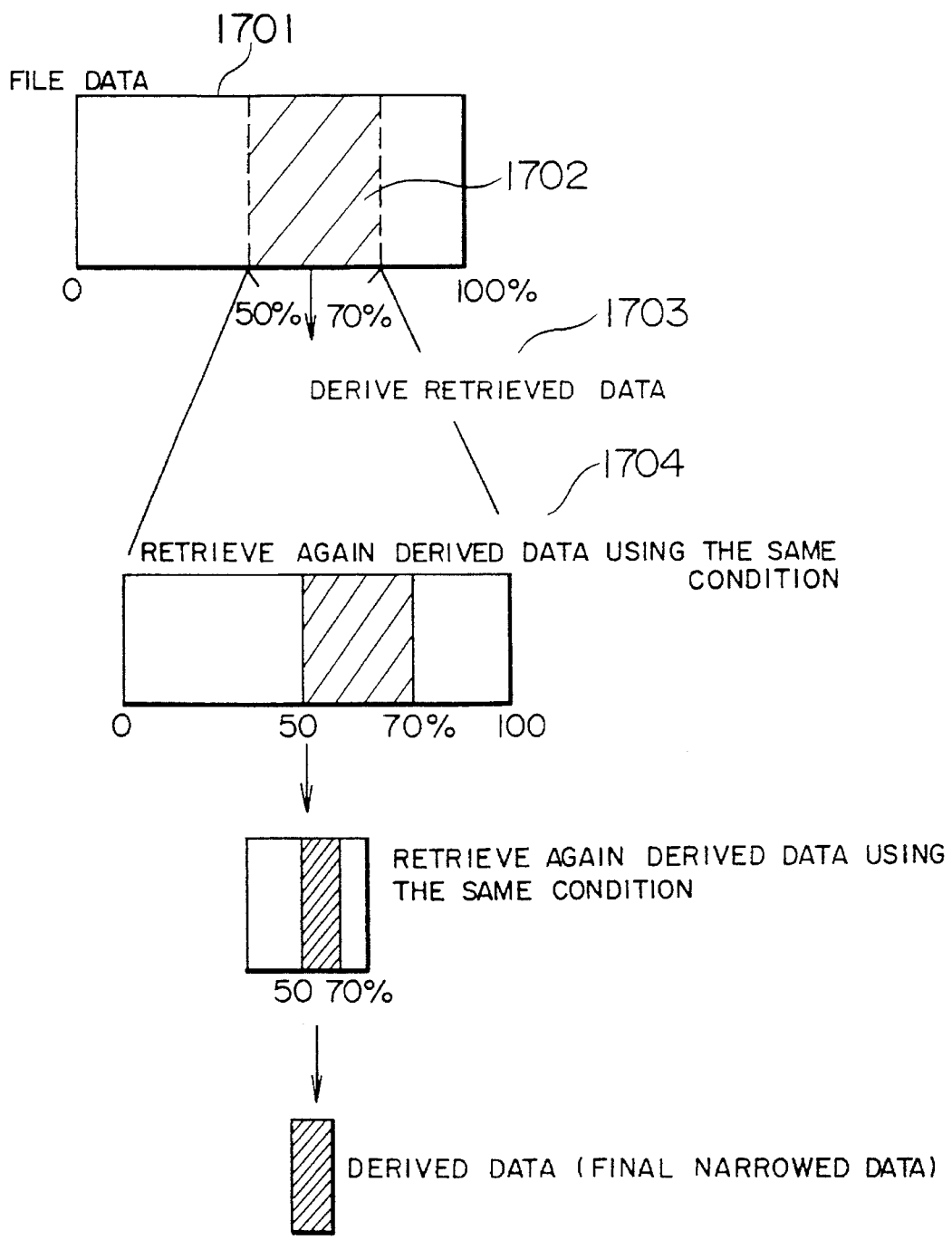
FIG. 17 illustrates the operation of narrowing the range of retrieved and derived data.

FIG. 17 illustrates how the range of retrieved result data is narrowed. A data set in the database file is indicated at 1701. From this data set, data 1702 within the range from 50% to 70% is retrieved and derived. Using the retrieved and derived at 1703 data, the data retrieval is again performed as indicated at 1704 using the same retrieving condition to thereby narrow the range of retrieved and derived data as desired.

The data retrieving apparatuses of the above embodiment are sold by the present assignee under the commodity type name of ETOILE/OP, which is herein incorporated for the reference sake.

According to the present invention, the retrieving conditions can be designated not by numerical values but by terms. Accordingly, even novices can retrieve desired data reliably.

The range for each term can be designated as a percentage range of item values of all data in the database file. Therefore, even if a user does not know the range of all item values stored in the database file, the data retrieval is possible. Furthermore, even if item values stored in the database file are changed, it is not necessary to change the retrieving condition equation for the data retrieval or narrow the range of retrieved data. Since the retrieved result data is displayed together with a satisfaction degree, a user does not rely upon the sixth sense, but the desired data can be retrieved while referring to the displayed satisfaction degree. Still further, the range of retrieved and derived data set can be narrowed by repetitively retrieving data from the retrieved and derived data.

Not only the satisfaction degree for each designated condition or term but also the total satisfaction degree for all items of each record are displayed, so that a user can evaluate synthetically the retrieving conditions, allowing a more objective data retrieval.

The total satisfaction degree is calculated while considering weights assigned to items. Therefore, a user may change the weight values to check a corresponding total satisfaction degree. In this manner, a user can narrow the range of data to be retrieved objectively and reliably, without relying upon the sixth sense.

What is claimed is:

1. A data retrieving computer apparatus for retrieving data satisfying a user request from data stored in a computer file, comprising:

a term defining means having quantitatively defined therein fuzzy terms assigned to each item to be retrieved in a form of rate ranges, a previously set retrieving condition range for each of said terms and a distribution curve having a function associated therewith and representing a satisfaction data distribution within said retrieving condition range for each of said terms;

a condition analyzing means responsive to an input fuzzy term of an item to be retrieved for analyzing an input retrieving condition equation including said input fuzzy term and converting said input retrieving condition equation into a value-based retrieving condition equation using information from said term defining means, said input fuzzy term included in said input retrieving condition equation being changed to numerical values in said value-based retrieving condition equation;

a data retrieving means for retrieving data from said computer file in accordance with said value-based retrieving condition equation supplied from said condition analyzing means:

a satisfaction degree evaluating means coupled to said data retrieving means, for calculating a satisfaction degree for each retrieved data from said data retrieving means using a corresponding said distribution curve, and for outputting a calculated said satisfaction degree; and a data narrowing means for narrowing said retrieved data from said data retrieving means to obtain narrowed data representing a sub-set of said retrieved data, said data narrowing means performing said narrowing using a same said value-based retrieving condition equation upon said retrieved data.

2. A data retrieving apparatus according to claim 1, wherein said term defining means includes a term information table for storing information set by said term defining means, and a calculating means for calculating a total satisfaction degree from satisfaction degrees respectively obtained for a plurality of said each item to be retrieved, and outputting said calculated total satisfaction degree.

3. A data retrieving apparatus according to claim 1, further comprising:
- a designating means coupled to said term defining means for designating a distribution of item data for each item in accordance with a corresponding said distribution curve set by said term defining means;
- an evaluation means for making a total evaluation of a plurality of items by evaluating each said satisfaction degree for each item of said plurality of items with a designated said distribution from said designating means and a total satisfaction degree; and
- a selecting means for selecting one of said satisfaction degree and a total satisfaction degree for each item in accordance with results of said total evaluation.

4. A data retrieving method of retrieving data using a computer for satisfying a user request from data stored in a computer file, comprising the steps of:
- providing a definition table, and quantitatively defining in said table fuzzy terms designated by a user to each item to be retrieved in a form of percentage rates, setting a retrieving condition range for each of said terms and a distribution curve having a function associated therewith and representing a satisfaction data distribution within said retrieving condition range for each of said terms in said definition table;
- in response to an entry of a fuzzy term by a user for an item to be retrieved, analyzing a retrieving condition equation including said fuzzy term entered by a user while referring to said definition table, and converting said retrieving condition equation into a value-based retrieving condition equation using said definition table;
- retrieving data from said computer file in accordance with said value-based retrieving condition equation;
- calculating a satisfaction degree for each retrieved data from said retrieving step using a corresponding said distribution curve, and outputting a calculated said satisfaction degree; and
- narrowing said retrieved data from said retrieving step to obtain narrowed data representing a sub-set of said retrieved data, said narrowing step performing said narrowing using a same said value-based retrieving condition equation upon said retrieved data.

5. A data retrieving method according to claim 4, further comprising a step of concurrently displaying results obtained at said retrieving step and said satisfaction degree of said retrieved data for an entered said fuzzy term.

6. A data retrieving method according to claim 4, wherein for a plurality of items designated by a user, said retrieving condition range of each said term is designated by coefficients representing a relative range of said term among ranges of other terms in accordance with a weight of each term.

7. A data retrieving method according to claim 4, wherein information set at said term defining step is stored in a term information table, and a total satisfaction degree is calculated from satisfaction degrees respectively calculated for a plurality of items to be retrieved.

8. A data retrieving method according to claim 4, further comprising the steps of:
- designating a distribution of item data for each item in accordance with a corresponding said distribution curve set at said term defining step;
- making a total evaluation of a plurality of items by evaluating each said satisfaction degree for each item of said plurality of items with said distribution being designated and a total satisfaction degree; and
- selecting one of said satisfaction degree for each item and a total satisfaction degree in accordance with results of said total evaluation.

9. A data retrieving method according to claim 4, wherein said satisfaction degree for each of a plurality of items is checked to narrow a range of said retrieved data satisfying the retrieving condition.

10. An information retrieving computer apparatus for retrieving information satisfying a desired condition from a computer database file, comprising:
- a term defining means having quantitatively defined therein attribute terms representing fuzzy retrieving conditions designated by a user to each item to be retrieved in the form of rate ranges, a previously set retrieving condition range for each of said terms and a distribution waveform having a function associated therewith and representing a satisfaction degree distribution within said retrieving condition range for each of said terms, said term defining means including a term information table;
- a condition analyzing means responsive to entry of a fuzzy term representing an attribute in an item to be retrieved for converting a retrieving condition equation including said entered fuzzy term into a value-based retrieving condition equation using information from said term defining means;
- a retrieving means for retrieving data from said computer database file in accordance with said value-based retrieving condition equation supplied from said condition analyzing means;
- a satisfaction degree evaluating means for calculating a satisfaction degree for each said retrieved data supplied from said retrieving means using a corresponding said distribution waveform, and for outputting said calculated satisfaction degree;
- a means for displaying the outputs of said satisfaction degree evaluating means and said retrieving means and for allowing a user interactively to select said retrieved data; and
- a data narrowing means for narrowing said retrieved data from said retrieving means to obtain narrowed data representing a sub-set of said retrieved data, said data narrowing means performing said narrowing using a same said value-based retrieving condition equation upon said retrieved data.

11. The apparatus according to claim 10, wherein said satisfaction degree evaluating means includes a means for designating relative weights to a plurality of items to be retrieved to calculate weighted satisfaction degrees and a total satisfaction degree for a plurality of items.

12. The apparatus according to claim 10, wherein each said distribution waveform is variably modified in accordance with a user's knowledge base.

* * * * *